United States Patent Office 3,082,261
Patented Mar. 19, 1963

3,082,261
PRODUCTION OF 5,6-DIMETHYLENE-1,2,3,4,7,7-HEXACHLORO-BICYCLO- [2,2,1]-HEPTENE-(2)
Klaus Juergen Fust, Ludwigshafen (Rhine), and Herbert Friederich, Worms, Germany assignors to Badische Anilin- & Soda-Fabrik Aktiengesellschaft, Ludwigshafen (Rhine), Germany
No Drawing. Filed July 21, 1960, Ser. No. 44,257
Claims priority, application Germany July 24, 1959
5 Claims. (Cl. 260—648)

This invention relates to a process for the production of 5,6-dimethylene-1,2,3,4,7,7-hexachlorobicyclo-[2,2,1]-heptene-(2) wherein novel initial compounds are employed.

A number of cyclic and also bicyclic vicinal dimethylene compounds are known in the art. For example, 1,2-dimethylenecyclohexane, 2,3-dimethylenebicyclo-[2,2,1]-heptane, 2,3-dimethylenebicyclo-[2,2,2]-octane and 2,3-dimethylenebicyclo-[2,2,3]-nonane have been obtained by splitting off 2 mols of acetic acid from the corresponding vicinal acetoxymethyl compounds by heating. If this method is applied to 5,6-di-acetoxymethyl-1,2,3,4,7,7-hexachlorobicyclo - [2,2,1] - heptadiene-(2,5) only low yields of the corresponding 5,6-dimethylene compound are obtained. Furthermore, the initial compound mentioned is not readily available.

According to K. Alder et al. (Chemische Berichte, vol. 90 (1957), pages 1 through 7) a vicinal dimethylene bicyclic compound containing an additional double bond in the ring system, namely 5,6-dimethylenebicyclo-[2,2,1]-heptene-(2) can be obtained by thermal decomposition of the corresponding bis-quaternized 5,6-bis-dimethylaminomethyl compound. This reaction proceeds very slowly and it is impossible to apply the said process to the production of 5,6-dimethylene-1,2,3,4,7,7-hexachlorobicyclo-[2,2,1]-heptane-(2), since spontaneous decomposition always takes place when applying the known process to amines of hexachlorobicycloheptane containing chlorine.

It is an object of the present invention to provide a process for the production of 5,6-dimethylene-1,2,3,4,7,7-hexachlorobicyclo-[2,2,1]-heptene-(2), which gives good yields also when carried out on an industrial scale. Another object of the invention is to provide a process for the production of 5,6-dimethylene-1,2,3,4,7,7-hexachlorobicyclo-[2,2,1]-heptene-(2), which starts from novel and readily available initial compounds.

In accordance with the invention it has been found that these objects are achieved by reacting a 5,6-bis-chloromethylhexachlorobicyclo-[2,2,1] - heptadiene-(2,5) of the formula:

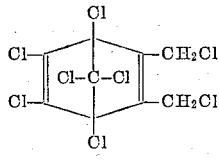

I with zinc or magnesium as a dehalogenating metal in an organic solvent which contains chemically bound oxygen. The organic solvents containing chemically bound oxygen are in the following briefly referred to as oxygen-containing organic solvents.

The reaction in accordance with the invention is a dehalogenation reaction which may be represented by the following equation:

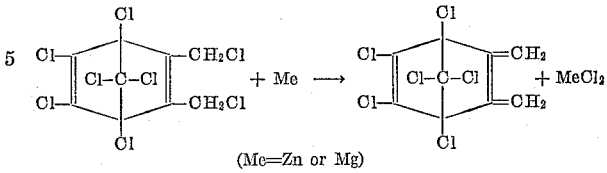

(Me=Zn or Mg)

It is surprising that only the chlorine atoms in the chloromethyl groups are removed while the other chlorine atoms remain completely unattacked.

The starting compounds of the general Formula I are readily accessible substances. The bis-chloromethyl compound can be obtained from hexachlorocyclopentadiene and 1,4-dichlorobutine-(2) in a Diels-Alder reaction.

The dehalogenation reaction is carried out in an oxygen-containing organic solvent which is inert or substantially inert to the reactants and to the reaction product under the conditions of the process. By the term "substantially inert" we mean that there is a certain reaction between the solvent and one of the reactants or the reaction product (as a rule with the metal employed), which reaction is, however, considerably slower than the dehalogenation reaction. For example, if zinc metal is employed as halogen acceptor and the solvent is acetic acid, a certain amount of zinc acetate will form with evolution of hydrogen, the amount depending inter alia on the purity of the metal and the water content of the acetic acid. Another example of a "substantially inert" solvent is acetone, if magnesium is the metal accepting the halogen. In this case, the reaction concurs with the formation of pinacol. Both of these side reactions are, however, appreciably slower than the dehalogenation reaction and therefore practically do not disturb it.

Solvents that lend themselves well to the reaction in accordance with the invention are alkanols having 1 to 6 carbon atoms, fatty acids with 2 to 4 carbon atoms, anhydrides of such acids and also their esters with alkanols having 1 to 4 carbon atoms. Another group of preferred solvents consists of ketones containing 3 to 9 carbon atoms, especially saturated aliphatic ketones, aliphatic ethers containing 4 to 8 carbon atoms, especially dialkyl ethers, cyclic ethers containing 4 to 6 carbon atoms, formamide and N-mono- and N,N-dimethylformamide, and lactams having 6 or 7 ring members, which lactams may also be N-substituted by alkyl radicals having 1 to 4 carbon atoms. Generally speaking, we prefer to employ those members of the classes listed above which are formed by one or two identical or different groups characteristic of the said classes and a saturated hydrocarbon structure with less than 10 carbon atoms. It is obvious that mixtures of two or more of the said solvents may also be used.

Suitable oxygen-containing organic solvents include methanol, ethanol, propanol, isopropanol, n-butanol, isobutanol, pentanol, hexanol, acetic acid, propionic acid, isobutyric acid, acetic acid anhydride, propionic acid anhydride, butyric acid anhydride, acetic acid methyl ester, acetic acid ethyl ester, propionic acid butyl ester, isobutyric acid propyl ester, acetone, methyl ethyl ketone, dibutyl ketone, diethyl ether, dibutyl ether, diisobutyl ether, di-isoamylether, tetrahydrofurane, dioxane, formamide, N-methylformamide, N,N-dimethylformamide, pyrrolidone, N-methylpyrrolidone, and ethylene glycol monomethyl ether.

In addition to the oxygen-containing organic solvents there may be used another inert organic solvent, preferably a hydrocarbon, such as benzene, toluene, cyclohexane, petroleum ether, ligroin and gasoline. Furthermore, the said oxygen-containing organic solvents containing chemically bound oxygen need not be water-free but may contain water in an amount up to 10% by weight with reference to the total mixture.

We prefer to use the oxygen-containing organic solvent in such an amount that the starting compound is completely dissolved. It is, however, also possible to employ a smaller or larger quantity of the solvent. As a rule, we use 100 to 1,500 g., advantageously 150 to 750 g., of the oxygen-containing solvent per mol of initial compound.

The zinc and the magnesium are used as metals, the metal preferably being in a state having a large surface area, for example in the form of dust, chips, grits or in granulated form. Technical grade metals can be employed as well as highly purified products. The dehalogenating metals are used in an amount which at least corresponds to the halogen to be removed, i.e., at least one gram-atom of the metal is used per mol of starting Compound I. We prefer to work with a certain excess, for example 1.1 to 3, especially 1.1 to 1.8 times, the theoretical amount. An excess of the dehalogenating metal is particularly recommended if the solvent employed is "substantially inert" under the conditions of the reaction.

It is advantageous to carry out the reaction in accordance with the invention in the presence of a small amount, such as 0.1 to 1.0% by weight with reference to the total mixture, of a compound capable of binding radicals and thus preventing polymerization reactions. Such compounds include hydroquinone and para-tertiary-butyl pyrocatechol.

In a convenient method of performing the novel process, the starting compound is dissolved in the oxygen-containing solvent. This solution has then added to it the dehalogenating metal. The reaction mixture should preferably be well mixed in order to achieve good contact between the dissolved Compound I and the metal surface. The reaction temperature is between about 0° and 200° C., advantageously between 20° and 70° C. Since the reaction is exothermic, the reaction heat must usually be removed, for example, by external cooling or by employing a solvent with a suitable boiling point and working under reflux. Sometimes, however, it may be necessary to heat the reaction mixture, especially at the end of the reaction.

In a variation of the process, the starting Compound I (either by itself or dissolved in an oxygen-containing solvent) is gradually added to the dehalogenating metal, which is preferably suspended in an oxygen-containing solvent.

The reaction mixtures can be worked up in conventional maner. It is, for example, possible to remove the solid constituents by filtering or centrifuging the reaction mixture while still hot and to separate the crystals being deposited when the filtrate is cooled. In another method, the reaction mixture is treated with water and subsequently extracted with a solvent which is immiscible with water. Useful solvents include ether or petroleum ether. The reaction product is thereby separated from the inorganic constituents and obtained in rather pure form by evaporating the solvent. The 5,6-dimethylene-1,2,3,4,7,7-hexachlorobicyclo-[2,2,1]-heptene-(2) can be further purified by distillation in vacuo or by recrystallization, for example from methanol or formamide.

5,6 - dimethylene-1,2,3,4,7,7-hexachlorobicyclo-[2,2,1]-heptene-(2) is a good algaecide. Applied in a concentration of 10 p.p.m., it kills chlorophyceae (green algae) completely within 24 hours. Furthermore, 5,6-dimethylene-1,2,3,4,7,7-hexachlorobicyclo-[2,2,1]-heptene-(2) is a valuable co-monomer in the production of flameproof polymers. 5,6-dimethylene - 1,2,3,4,7,7 - hexachlorobicyclo-[2,2,1]-heptene-(2) is also suitable as a starting compound for other chemical reactions.

The invention is further illustrated by the following examples, but is not restricted to these examples. The parts given are parts by weight.

*Example 1*

A mixture of 492 parts of 1,4-dichlorobutine-(2) and 1,200 parts of hexachlorocyclopentadiene is heated for 48 hours at 140° to 150° C. All ingredients of the mixture boiling below 100° C. at 15 mm. Hg absolute are then distilled off. 500 parts of petroleum ether are added to the residue and the mixture is cooled to 0° C. There are obtained by vacuum filtration 1,190 parts of 5,6-bis-(chloromethyl) - 1,2,3,4,7,7 - hexachlorobicyclo-[2,2,1]-heptadiene-(2,5).

A solution of 792 parts of 5,6-bis-(chloromethyl)-1,2,3,4,7,7-hexachlorobicyclo - [2,2,1] - heptadiene-(2,5) in 700 parts of diethyl ether (stabilized with 1 part of para-tetriary-butyl pyrocatechol) is added within half an hour while stirring to a mixture, heated to 40° C., of 180 parts of zinc dust and 700 parts of methanol. The ether which distills off during the reaction is condensed in a descending condenser and collected. The mixture is allowed to cool to room temperature after the reaction is finished.

A solution of 30 parts of 98% sulfuric acid in 500 parts of water is added to the reaction mixture. The organic constituents are separated by extracting the mixture twice with 400 parts of petroleum ether. The organic phases are combined and dried with potasisum carbonate. By evaporating the solvent there are obtained 640 parts of a crude reaction product from which 600 parts of pure 5,6-dimethylene-1,2,3,4,7,7-hexachlorobicyclo-[2,2,1]-heptene-(2) are obtained after recrystallization from methanol. The melting point is 85° C. and the yield is 92% of the theory.

*Example 2*

A solution of 396 parts of 5,6-bis-(chloromethyl)-1,2,3,4,7,7-hexachlorobicyclo-[2,2,1]-heptadiene-(2,5) in 500 parts of acetone (stabilized with 0.2 part of para-tertiary butyl pyrocatechol) is added while stirring within half an hour to a mixture, heated to 60° C., of 90 parts of zinc dust and 200 parts of dimethyl formamide.

After the addition is finished, the acetone is evaporated under diminished pressure, the temperature of the mixture being 30 to 50° C. The residue has added to it 50 parts of 98% sulfuric acid dissolved in 500 parts of water. The mixture is then extracted twice with 200 parts of petroleum ether. The combined extracts are dried with sodium carbonate and filtered through aluminum oxide. The solvent is evaporated and the residue recrystallized from methanol. 80 parts of 5,6-di-methylene - 1,2,3,4,7,7 - hexachlorobicyclo-[2,2,1]-heptene-(2) are obtained.

*Example 3*

196 parts of 5,6-bis-(chloromethyl)-1,2,3,4,7,7-hexachlorobicyclo-[2,2,1]-heptadiene-(2,5) are dissolved in 600 parts of acetic acid ethyl ester. 0.4 part of para-tertiary butyl pyrocatechol is added and the solution is shaken with 10 parts of zinc dust. 30 parts of zinc dust are gradually added after the reaction has started. The temperature is kept below 60° C. by external cooling.

The solid constituents of the reaction mixture are filtered off in a vacuum filter after the addition of zinc dust is finished. The filtrate is shaken with a cold solution of 30 parts of 98% sulfuric acid in 500 parts of water. The organic phase is dried with sodum carbonate and the solvent removed. 115 parts of 5,6-dimethylene- 1,2,3,4,7,7-hexachlorobicyclo-[2,2,1]-heptene-(2) are obtained.

If the acetic acid ethyl ester is replaced by 600 parts of butyric acid methyl ester, there are obtained under otherwise identical conditions 117 parts 5,6-dimethylene-1,2,3,4,7,7-hexachlorobicyclo-[2,2,1]-heptene-(2).

Example 4

50 parts of magnesium are added within half an hour while stirring to a solution of 336 parts of 5,6-bis-(chloromethyl) - 1,2,3,4,7,7 - hexachlorobicyclo-[2,2,1]-heptadiene-(2,5) in 300 parts of ethyl ether. The ether is partly distilled off by the reaction heat.

The reaction mixture is shaken with a cold solution of 30 parts of 98% sulfuric acid in 500 parts of water and subsequently extracted twice with 100 parts of petroleum ether. The solution is then filtered over aluminum oxide and the solvent evaporated. 230 parts of 5,6-dimethylene-1,2,3,4,7,7-hexachlorobicyclo-[2,2,1]-heptene-(2) are obtained.

Example 5

A solution of 196 parts of 5,6-bis-(chloromethyl)-1,2,3,4,7,7-hexachlorobicyclo-[2,2,1]-heptadiene-(2,5), in 250 parts of tetrahydrofurane are gradually added within 15 minutes to a suspension of 45 parts of zinc dust in 120 parts of tetrahydrofurane. The temperature is 30° C. at the beginning and rises during the reaction until the reaction mixture boils under reflux. The reaction mixture is allowed to cool to room temperature after the addition of the zinc dust has been finished. 200 parts of 3% aqueous sulfuric acid are then added and the mixture is extracted twice with 200 parts of ethyl ether.

The ethereal phases are combined and dried with potassium carbonate. The solvent is evaporated under diminished pressure and the residue recrystallized from methanol. There are obtained 135 parts of 5,6-dimethylene - 1,2,3,4,7,7 - hexachlorobicyclo-[2,2,1]-heptene-(2) having a melting point of 83° C. The yield is 83% of the theory.

Example 6

0.3 part of para-tertiary butyl pyrocatechol are added to a suspension of 45 parts of zinc dust in 80 parts of methyl isobutyl ketone. To this suspension there is added within 20 minutes a solution of 196 parts of 5,6-bis-(chloromethyl) - 1,2,3,4,7,7-hexachlorobicyclo-[2,2,1]-heptadiene-(2,5) in 260 parts of methyl isobutyl ketone. The initial temperature of 30° C. is maintained throughout the reaction. The reaction mixture is allowed to cool to room temperature when the addition of the said solution is complete. 200 parts of 3% aqueous sulfuric acid are then added and the mixture is extracted twice with 200 parts of ethyl ether, 200 parts of ethyl ether being used each time.

The ethereal extracts are combined and dried with potassium carbonate. The solvent is removed under diminished pressure and the residue recrystallized from methanol. There are obtained 70 parts of 5,6-dimethylene-1,2,3,4,7,7-hexachlorobicyclo-[2,2,1]-heptene-(2) having a melting point of 80° C.

Example 7

196 parts of 5,6-bis-(chloromethyl)-1,2,3,4,7,7-hexachlorobicyclo-[2,2,1]-heptadiene-(2,5) are dissolved in a mixture of 100 parts of n-butanol and 100 parts of dibutyl ether. The solution is stabilized by the addition of 0.4 part of hydroquinone and subsequently introduced within 20 minutes while stirring into a suspension of 45 parts of zinc dust in 100 parts of n-butanol.

The reaction mixture is worked up as described in Example 1. 138 parts of 5,6-dimethylene-1,2,3,4,7,7-hexachlorobicyclo-[2,2,1]-heptene-(2) having the melting point of 81° C. are obtained.

Example 8

196 parts of 5,6-bis-(chloromethyl)-1,2,3,4,7,7-hexachlorobicyclo-[2,2,1]-heptadiene-(2,5) are dissolved in a mixture of 100 parts of formamide and 100 parts of diethyl ether. The solution is stabilized by adding 0.2 part of para-tertiary butyl pyrocatechol and subsequently introduced within 20 minutes while stirring into a suspension of 45 parts of zinc dust in 100 parts of formamide.

The reaction mixture is worked up as described in Example 1. There are obtained 146 parts of 5,6-dimethylene - 1,2,3,4,7,7 - hexachlorobicyclo-[2,2,1]-heptene-(2) having the melting point 81° C.

Example 9

196 parts of 5,6-bis-(chloromethyl)-1,2,3,4,7,7-hexachlorobicyclo-[2,2,1]-heptadiene-(2,5) are dissolved in a mixture of 100 parts of propionic acid and 150 parts of benzene. 0.2 part of para-tertiary butyl pyrocatechol is added, and the solution is introduced while stirring into a suspension of 45 parts of zinc dust in 100 parts of propionic acid at such a rate that the reaction temperature does not exceed 65° C. The reaction mixture is stirred for a further ten minutes after the addition has been completed and is subsequently allowed to cool to room temperature. 300 parts of 3% aqueous sulfuric acid are then added. The mixture is extracted with 250 parts of ethyl ether and the ethereal extract dried with sodium sulfate. The solvent is removed under diminished pressure and the residue recrystallized from methanol. 150 parts of 5,6 - dimethylene-1,2,3,4,7,7-hexachlorobicyclo-[2,2,1]-heptene-(2) are obtained. The melting point of the product is 81° C.

Example 10

A solution of 196 parts of 5,6-bis-(chloromethyl)-1,2,3,4,7,7-hexachlorobicyclo-[2,2,1]-heptadiene-(2,5) in 250 parts of dioxane (stabilized by the addition of 0.3 part of para-tertiary butyl pyrocatechol) are added within 30 minutes of a suspension of 15 parts of magnesium in 100 parts of dioxane. The reaction mixture is then allowed to cool to room temperature and has added to it 200 parts of 3% aqueous sulfuric acid. The mixture is extracted twice with 200 parts of ether.

The ethereal extracts are combined and dried with potassium carbonate. The solvent is removed under diminished pressure and the residue recrystallized from methanol. 100 parts of 5,6-dimethylene-1,2,3,4,7,7-hexachlorobicyclo-[2,2,1]-heptene-(2) are obtained.

Example 11

45 parts of zinc dust are gradually added while stirring to a solution of 196 parts of 5,6-bis-(chloromethyl)-1,2,3,4,7,7-hexachlorobicyclo-[2,2,1]-heptadiene-(2,5) in 200 parts of acetic acid anhydride, the temperature of the mixture being kept below 60° C. The reaction mixture is stirred for a further 15 minutes and the solid constituents are removed by vacuum filtration. The acetic acid anhydride is evaporated from the filtrate at a pressure of 3 to 5 mm. Hg absolute. The residue is dissolved in 200 parts of ethyl ether, and the ethereal solution is shaken with 200 parts of 10% aqueous sulfuric acid. The ethereal phase is dried with sodium sulfate and the ether subsequently distilled off. By recrystallization of the residue from methanol, 5,6-dimethylene-1,2,3,4,7,7-hexachlorobicyclo-[2,2,1]-heptene-(2) is obtained in a yield of 49% of the theory.

Example 12

45 parts of zinc dust are gradually added while stirring to a solution, stabilized wtih 0.4 part of para-tertiary butyl pyrocatechol, of 198 parts of 5,6-bis-(chloromethyl) - 1,2,3,4,7,7 - hexachlorobicyclo-[2,2,1]-heptadiene-(2,5) in 400 parts of 90% aqueous acetone, at such a rate that the reaction temperature does not exceed 60° C. From the reaction mixture the acetone is removed under diminished pressure at a bath temperature of 30 to 50° C. The residue is dissolved in 200 parts of ethyl ether and the ethereal solution shaken with 200 parts of 5% aqueous sulfuric acid. The organic phase is dried with sodium sulfate. The ether is evaporated in vacuo and the residue recrystallized from methanol. There are obtained 60 parts of 5,6-dimethylene-1,2,3,4,7,7-hexachlorobicyclo-[2,2,1]-heptene-(2).

We claim:
1. A process for the production of 5,6-dimethylene-1,2,3,4,7,7-hexachloro-[2,2,1]-heptene-(2) which comprises reacting 5,6-bis-chloromethyl-hexachlorobicyclo-[2,2,1]-heptadiene-(2,5) of the formula:

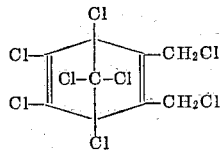

with a dehalogenating metal selected from the group consisting of zinc and magnesium in an organic solvent which contains chemically bound oxygen and which is at least substantially inert under the conditions of the reaction.

2. The process as defined in claim 1 wherein the dehalogenating metal is used in an amount of between 1.1 and 3 gram-atoms per mol of 5,6-bis-chloromethyl-hexachloro-bicyclo-(2,2,1)-heptadiene-(2,5).

3. The process as defined in claim 2 wherein said reaction is carried out at a temperature between about 0° C. and 200° C.

4. The process as defined in claim 2 wherein said reaction is carried out at a temperature between about 20° C. and 70° C.

5. The process as defined in claim 2 wherein said reaction is carried out in the presence of about 0.1 to 1.0% by weight, with reference to the total reaction mixture, of a compound selected from the group consisting of hydroquinone and para-tertiary-butyl procatechol.

References Cited in the file of this patent
UNITED STATES PATENTS

| | | |
|---|---|---|
| 2,905,725 | Schmerling | Sept. 22, 1959 |
| 2,951,098 | Hoch et al. | Aug. 30, 1960 |
| 2,951,099 | Hoch | Aug. 30, 1960 |